(12) United States Patent
Khullar et al.

(10) Patent No.: US 12,511,108 B2
(45) Date of Patent: Dec. 30, 2025

(54) SYSTEMS AND METHODS FOR DECENTRALIZED FEATURE TOGGLES

(71) Applicant: SAP SE, Walldorf (DE)

(72) Inventors: Vipul Khullar, New Delhi (IN); Ayush Kumar, Gorakhpur (IN); Soma Shekara Pavan Kumar Marla, Bangalore (IN)

(73) Assignee: SAP SE, Walldorf (DE)

( * ) Notice: Subject to any disclaimer, the term of this patent is extended or adjusted under 35 U.S.C. 154(b) by 207 days.

(21) Appl. No.: 18/540,662

(22) Filed: Dec. 14, 2023

(65) Prior Publication Data
US 2025/0199780 A1    Jun. 19, 2025

(51) Int. Cl.
| | | |
|---|---|---|
| *G06F 9/44* | (2018.01) |
| *G06F 8/30* | (2018.01) |
| *G06F 8/41* | (2018.01) |
| *G06F 8/71* | (2018.01) |
| *G06F 8/73* | (2018.01) |
| *G06F 9/455* | (2018.01) |
| *G06F 9/50* | (2006.01) |
| *G06F 11/36* | (2025.01) |

(52) U.S. Cl.
CPC ................ *G06F 8/433* (2013.01)

(58) Field of Classification Search
CPC . G06F 8/433; G06F 8/443; G06F 8/41; G06F 8/65; G06F 8/71; G06F 9/451; G06F 9/4881; G06F 9/4442; G06F 9/44563; G06F 8/4435; G06F 8/54
See application file for complete search history.

(56) References Cited

U.S. PATENT DOCUMENTS

| | | | |
|---|---|---|---|
| 11,237,824 B2* | 2/2022 | Masis | ............ G06F 8/73 |
| 11,334,349 B2 | 5/2022 | Gupta | |
| 11,379,217 B1 | 7/2022 | Eberlein et al. | |
| 11,748,080 B2* | 9/2023 | Segler | ............ G06F 8/71 |
| | | | 717/110 |

* cited by examiner

*Primary Examiner* — Thuy Dao
(74) *Attorney, Agent, or Firm* — Fountainhead Law Group, PC

(57) ABSTRACT

Embodiments of the present disclosure include techniques for decentralizing feature toggles. In certain embodiments, feature toggles are generated for features across a plurality of software systems. The feature toggles include annotations specifying dependencies across the plurality of software systems. The annotated feature toggles are stored in a central repository accessible by the plurality of software systems. When a feature toggle is enabled, feature toggles across the systems may be retrieved from the repository and analyzed by an LLM to determine which feature toggles may need to be updated to prevent a software error.

20 Claims, 7 Drawing Sheets

SYSTEMS AND METHODS FOR DECENTRALIZED FEATURE TOGGLES

BACKGROUND

The present disclosure relates generally computer systems, and in particular, to systems and method for decentralized feature toggles.

In current large enterprise software systems, there is a shift towards hybrid-solutions and/or pure cloud solutions. But such a shift comes at a cost. In a pure cloud solution, the customer often may not need to worry about the new releases, backwards compatibility, or setting up the systems for newer versions. However, for a hybrid model, where some software solutions are on-premises and some are on cloud, middleware software may be used which interacts with the on-premises system and the cloud system or vice-versa to maintain consistency between all the systems across all the landscapes without manual efforts.

As software systems become more disparate and interconnected, upgrades in one system may impact other systems. Typically, complicated and time consuming manual upgrades are required for new features of one system to be useful across a deployment.

The present disclosure addresses these and other challenges and is directed to techniques for decentralizing feature toggles to allow multiple systems to implement the feature toggle.

DETAILED DESCRIPTION

Described herein are techniques for storing and retrieving public data. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Figure 1:
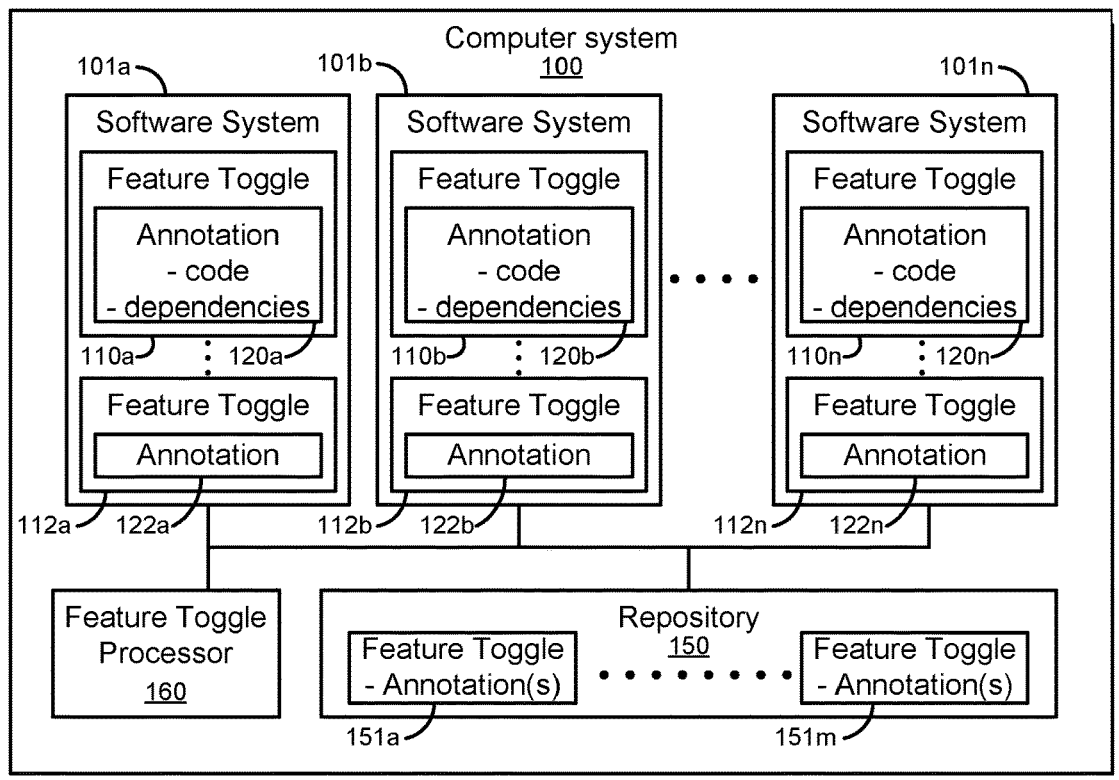
FIG. 1 illustrates a system using decentralized feature toggles according to an embodiment.

FIG. 1 illustrates a system using decentralized feature toggles according to an embodiment. Computer system 100 may include many computers arranged in various configurations. In one embodiment, computer system 100 includes a cloud computer system and an on-premise system. A cloud computer system typically refers to the delivery of computing services—including servers, storage, databases, networking, software, analytics, and intelligence—over the internet ("the cloud"). An on-premise ("on-prem") computer system typically refers to software that is installed and runs on computers on the premises of the person or organization using the software, rather than at a remote facility such as a server farm or cloud. Computer system 100 includes multiple interconnected software systems 101a-n deployed across both a cloud computer system and on-prem computer system. When software systems are deployed across both cloud and on-prem systems, they are often referred to as hybrid systems (or hybrid software deployments). Each interconnected software system 101a-n may have features or functions the are used by another one or more of the interconnected software systems 101a-n. Such systems are also sometimes referred to as being "coupled" or "interoperable," for example. Typically, when such an interconnected system goes through software upgrade, where code in one or more of the systems is modified, it is often necessary to upgrade some or all of the other connected systems so that the code change in one system does not cause failures in another system. Features and advantages of the present disclosure provide a mechanism to link code changes and establish dependencies across interconnected software systems to reduce or eliminate system failures caused by code changes in one or more of the software systems, for example.

In various embodiments, software systems 101a-n are configured with feature toggles 110a-n through 112a-n, for example. A feature toggle enables and disables particular features of the plurality of software systems. For example, a feature toggle in software development provides an alternative to maintaining multiple feature branches in source code. A condition within the code enables or disables a feature (e.g., by activating or deactivating program code from being executed) during runtime. Accordingly, particular features (and program code) may be enabled or disabled in different situations. For example, program code may be enabled/disabled during development, production, testing (quality assurance, QA), or a version of code may be released that has unfinished features. Unfinished features may be hidden (toggled) so that they do not appear in the user interface, for example. A feature toggle is also sometimes referred to as a feature switch, feature flag, feature gate, feature flipper, or conditional feature, for example.

As illustrated in FIG. 1, software systems 101a may comprise a plurality of feature toggles 110a through 112a, software systems 101b may comprise a plurality of feature toggles 110b through 112b, and software systems 101n may comprise a plurality of feature toggles 110n through 112n. Features and advantages of the present disclosure include feature toggles comprising annotations that specify program code changes in a local software system where a particular feature toggle is located resulting from said enabling and disabling of the particular feature toggle and program code in the plurality of interconnected systems that is dependent on the specified program code. For example, annotation 120a in feature toggle 110a may specify program code changes in software system 101a resulting from enabling and disabling feature toggle 110a. Annotation 120a may further specify program code in other interconnected systems 101b-n that is dependent on the program code specified in annotation 120a, for example. Similarly, annotation 122a in feature toggle 112a may specify program code changes in software system 101a resulting from enabling and disabling feature toggle 112a and further specify program code in other interconnected systems 101b-n that is dependent on the program code specified in annotation 122a. Likewise, annotation 120b in feature toggle 110b may specify program code changes in software system 101*b* resulting from enabling and disabling feature toggle 110*b* and further specify program code in other interconnected systems 101*a-n* that is dependent on the program code specified in annotation 120*b*, for example.

Embodiments of the present disclosure may include a feature toggle processor 160 to operate on the feature toggles as described herein. Feature toggle processor 160 may generate feature toggle dependency information and perform dependency analysis. Further examples of feature toggle processor 160 are provided below. In one embodiment, feature toggle processor 160 gathers the feature toggles 110*a-n* through 112*a-n* from the plurality of interconnected software systems and stores the feature toggles in a repository 150. Feature toggle processor 160 may process the feature toggles and annotations to establish links between dependent code features across interconnected software systems 101*a-n* to determine when particular feature toggle status changes (enabled/disabled) may require an upgrade of one or more of the interconnected software systems 101*a-n* (e.g., to avoid an error condition). For example, if feature toggle 110*a* is enabled, a particular feature (e.g., program code) of software system 101*a* may become active. Activation of that feature may require certain features to be active in other software systems 101*b-n*. Gathering and storing feature toggles 151*a-m* for the interconnected software systems (e.g., code and dependencies) in repository 150 allows feature toggle processor 160 to retrieve corresponding to the enabled feature as well as related code and dependencies. Feature toggle processor 160 may then determine, based on the annotations in the feature corresponding to the enabled feature, whether or not an upgrade is required to implement the enabled feature on software systems 101*a-n*, for example. In some embodiments described herein, an artificial intelligence (AI) model may be used to generate a score indicating the likelihood an error if software updates are not performed across particular systems, for example.

Figure 2:
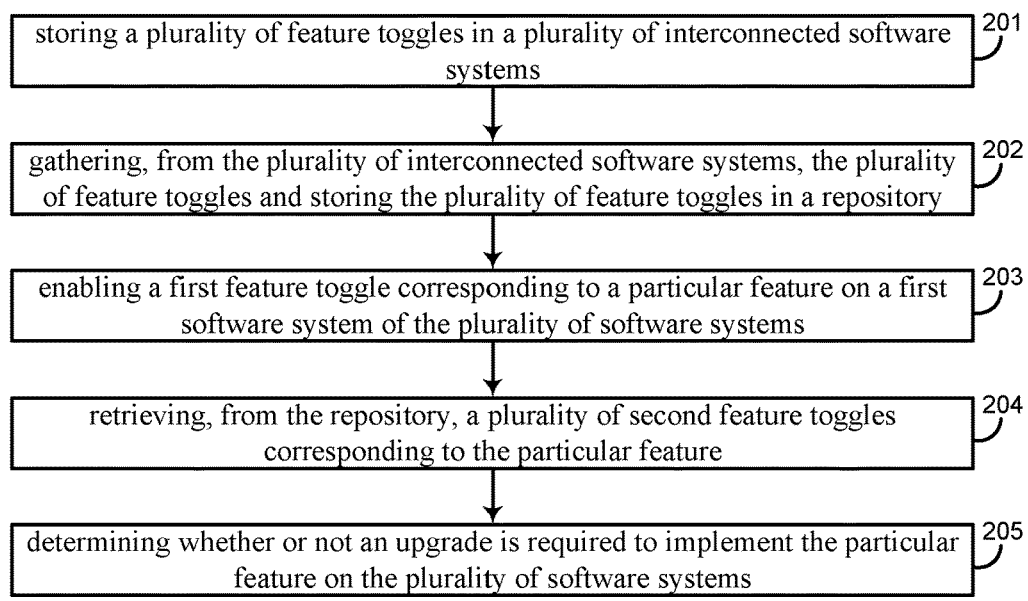
FIG. 2 illustrates a decentralized feature toggle method according to an embodiment.

FIG. 2 illustrates a decentralized feature toggle method according to an embodiment. At 201, the system stores a plurality of feature toggles in a plurality of interconnected software systems. The feature toggles may enable and disable particular features of the plurality of software systems. The plurality of feature toggles may comprise annotations. For each feature toggle, the annotations specify program code changes in a local software system where a particular feature toggle is located resulting from the enabling and disabling of the particular feature toggle. The annotations may further specify program code in the plurality of interconnected systems that is dependent on the specified program code. At 202, the system gathers, from the plurality of interconnected software systems, the plurality of feature toggles and stores the plurality of feature toggles in a repository. At 203, the system enables a first feature toggle corresponding to a particular feature on a first software system of the plurality of software systems. At 204, the system retrieves, from the repository, a plurality of second feature toggles corresponding to the particular feature. For example, the system may retrieve feature toggles in other systems that the enabled feature toggle is dependent on. Additionally, the system may retrieve other feature toggles that are dependent on the enabled feature toggle, for example. At 205, the system determining whether or not an upgrade is required to implement the particular feature on the plurality of software systems.

Figure 3A:
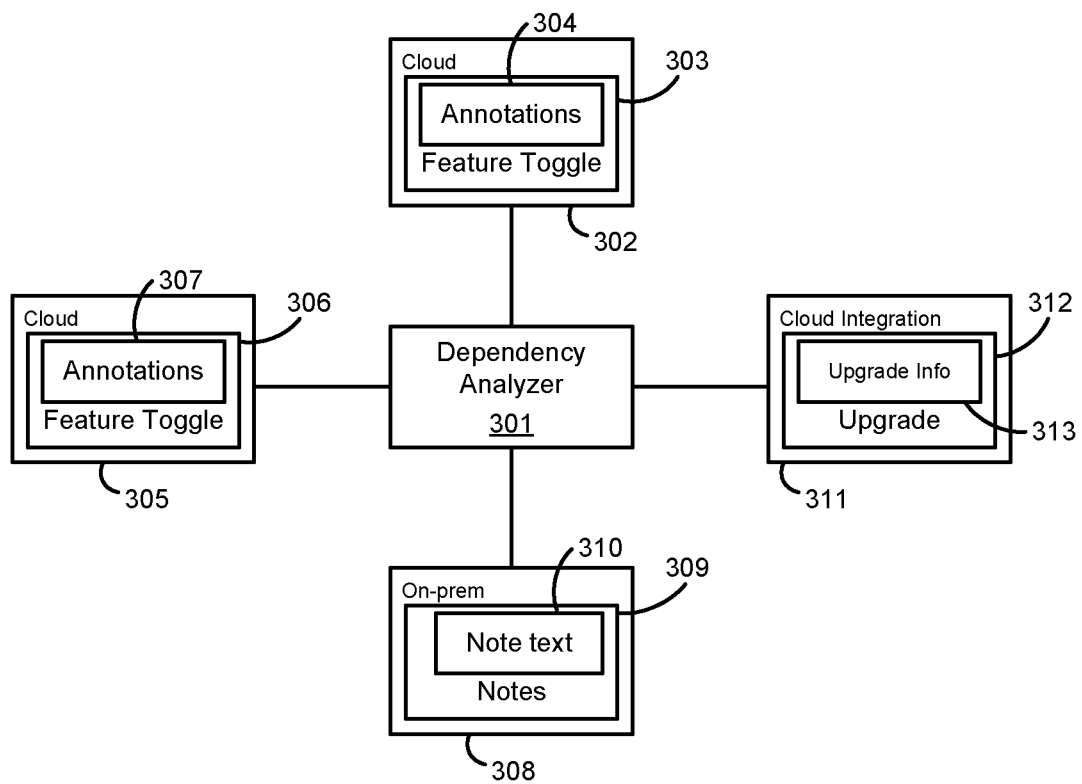
FIG. 3A illustrates an example of dependency analysis according to an embodiment.

FIG. 3A illustrates an example of dependency analysis according to an embodiment. In this example, multiple software systems 302, 305, 308, and 311 are coupled to a dependency analyzer 301. Dependency analyzer 301 may first extract the relevant systems from the annotations and then triggers a search for the existing annotations, upgrade info, notes across the different software systems, for example. In this example, a cloud software system 302 includes a feature toggle 303 comprising annotations 304, a second cloud software system 305 includes feature toggle 306 comprising annotations 307, an on-prem software system 308 includes notes 309 comprising text 310, and a cloud software system 311 includes a package upgrade 312 comprising upgrade information 313. As illustrated in FIG. 3, system 308 includes development notes and system 311 includes software upgrade information. In some systems, notes and upgrade information are included for providing features and/or issue fixes for the delivered software for legacy on-premise and integration artifacts where feature toggles are not available. Certain embodiments may identify notes and upgrade information (e.g., text describing dependencies and/or code) and extract the descriptive information from them. The information from these sources may be evaluated to determine if the notes/integration upgrade patches are required within other systems in order for an activated feature toggle to work, for example.

In some embodiments, AI based search capabilities and keyword matching are used to produce a list of all feature toggles, notes, package upgrades, which may then be sent to the system implementing the feature toggle, for example.

Figure 3B:
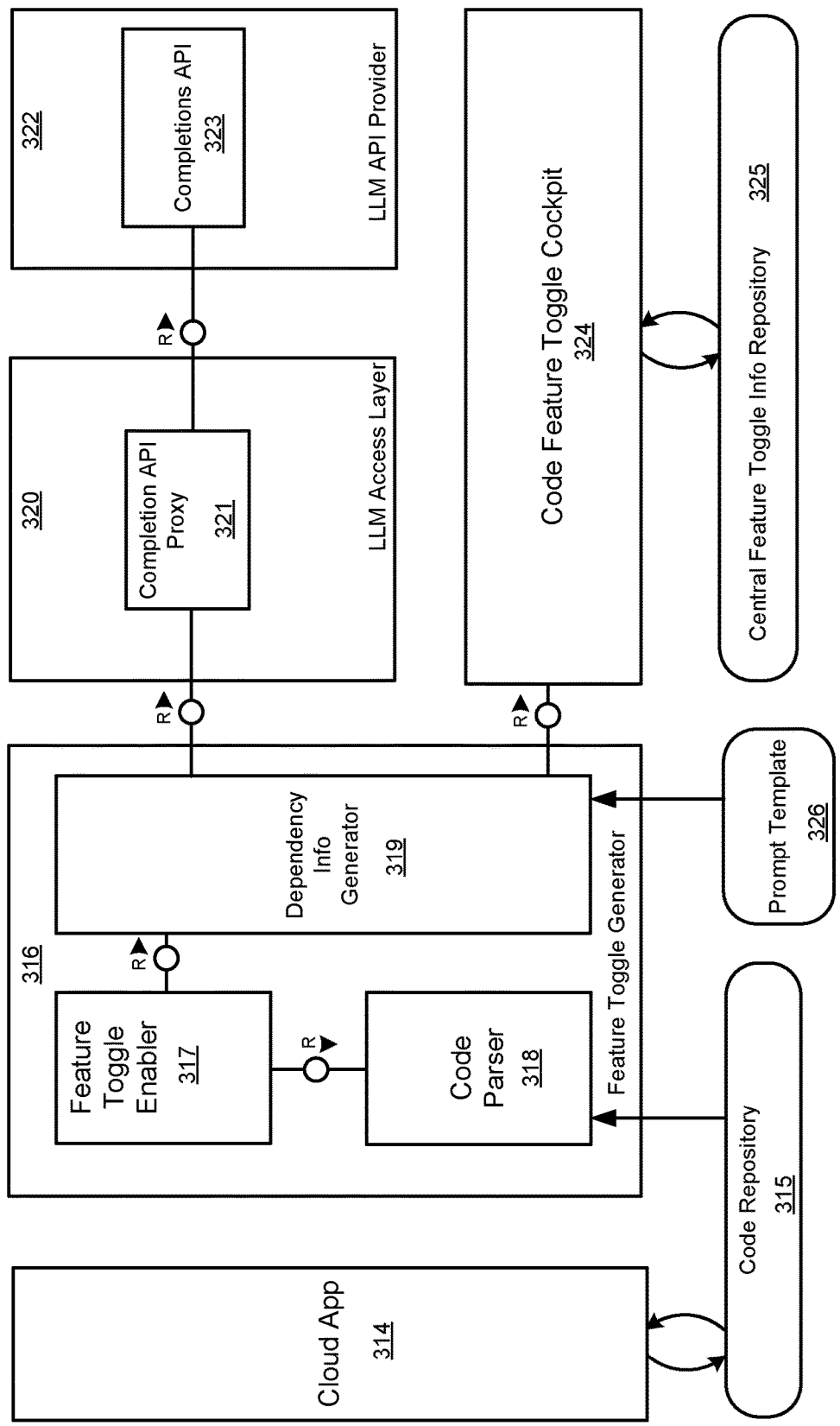
FIG. 3B illustrates an example system for generating dependency information according to another embodiment.
Figure 3C:
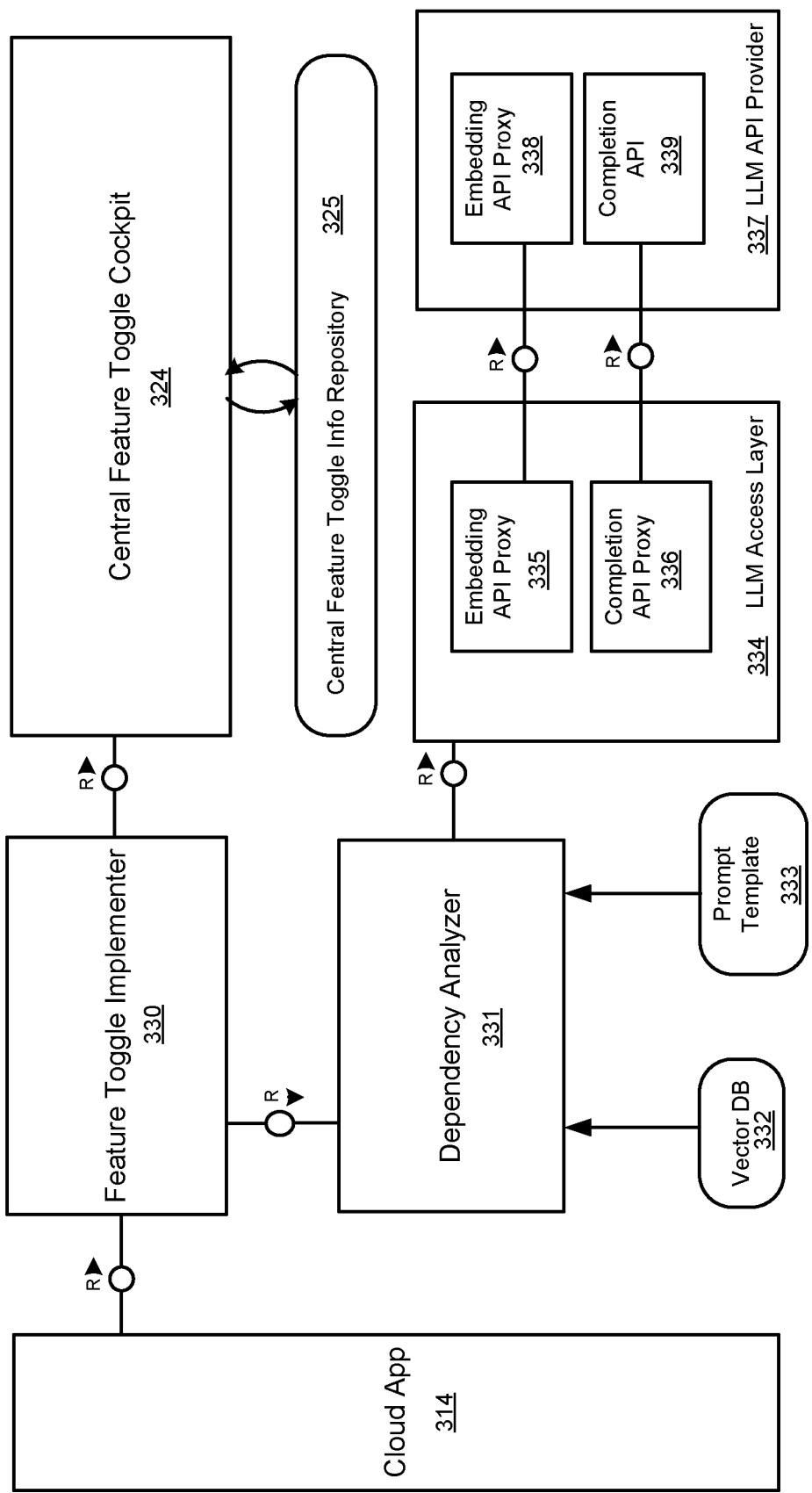
FIG. 3C illustrates another example dependency analyzer system according to another embodiment.

In some embodiments, there are two steps to the process of decentralizing feature toggles to reduce error states across systems. First, the system uses feature toggles to capture dependency information from the code captured in the feature toggle. Such information may then be persisted in a central feature toggle repository. FIG. 3B below illustrates an example software architecture for capturing dependency information. This information is used during the implementation of the feature toggle in a system to check for dependent components when the feature toggle is enabled. Second, the system uses feature toggle dependency information when a feature toggle is being implemented. This may check for any dependencies or dependent components that might be affected due to the activation of the feature toggle, for example. FIG. 3C below illustrates an example software architecture for using the feature dependency information to reduce software error conditions, for example.

FIG. 3B illustrates an example system for generating dependency information according to another embodiment. FIG. 3B illustrates a cloud application 314 coupled to a code repository 315 (e.g., GitHub). Code repository captures program code segments activated and deactivated when feature toggles are enabled and disabled, respectively, for example. A feature toggle generator 316 is coupled to the code repository 325. Feature toggle generator 316 is used to create feature toggles and determine dependencies between feature toggles, which is included in feature toggle annotations. Feature toggle generator 316 includes a feature toggle enabler 317, code parser 318, and dependency information generator 319. Feature toggle enabler 317 facilitates the enablement of feature toggles within a system for a specific code/feature change. The code changes (e.g., differences between code as part of the feature toggle) are captured within the feature toggle. Code parser 318 captures the code to identify the changed part of the code and passes it to the dependency information generator 319. Dependency information generator 319 uses a Large Language Model (LLM) API to analyze the code and identify dependencies on other components. A prompt template 326 is used to pass a prompt to the LLM API along with the code piece under analysis. A prompt is paragraph of effective queries or inputs to guide an AI language model towards generating desired responses. An input is generally added to a prompt template. Embodiments may add code from the annotations or dependent code to the prompt, for example. Finally, the dependency information is stored in the feature toggle in the form of annotations. Dependencies in an annotation may be tuples linking particular code in particular systems with other particular code in other particular systems (e.g., @DependentOn: {Systems1-Code1, System2-Code2}).

Dependency information generator 319 is coupled to an LLM access layer 320, which in turn is coupled to an LLM API provider 322. LLM access layer 320 acts as API Proxy Layer to reduce dependency on a single LLM API provider (e.g., ChatGPT) and provides a common functionality across the model providers, for example. LLM API provider 322 is the actual API of the LLM. LLM access layer 320 and LLM API provider 322 include completion API 321 and 323, respectively, which are configured to complete the prompt entered into the LLM with any appended code (e.g., answers a question such as, "identify dependencies of the appended code for systems X, Y, and Z").

Dependency information generator 319 is further coupled to central feature toggle cockpit 324. Central feature toggle cockpit 324 captures and manages the feature toggle information across interconnected software system. Central feature toggle cockpit 324 is coupled to central feature toggle repository 325. Central feature toggle repository 315 is repository to store the feature toggles from across the interconnected software systems, including the feature toggles and information corresponding to dependencies of the feature toggles.

FIG. 3C illustrates a more detailed example of dependency analyzer system according to another embodiment. In this example, a cloud application 314 is coupled to a feature toggle implementer 330. When a feature toggle is activated within a system, the feature toggle implementer 330 first gathers the appropriate information from the feature toggle cockpit 324 (e.g., from the repository 325) and then passes the annotated feature toggle information to the dependency analyzer 331 for identifying software systems that are dependent on the activated feature toggle and software systems upon which the activated feature toggle depends, for example. Feature toggle implementer 330 is coupled to dependency analyzer 331 to help perform the dependency analysis. For example, dependency analyzer 331 may be coupled to an LLM access layer 334, which is coupled to an LLM API provider 337. Because LLMs typically have limits on the number of tokens (e.g., words) they can process, the annotated feature toggle information from the repository may first be converted to embeddings and stored in vector database (DB) 332. For instance, annotated feature toggle information from the repository may be entered into embedding API proxy 335 and embedding API 338 to produce embeddings, which may then be stored in vector DB 332. Accordingly, data from the feature toggle repository 325 may be used to query a corresponding vector representation of the data in vector DB 332. In other words, vector representations of information in the feature toggle repository may be queried to extract only the relevant information based on the context. Accordingly, dependency analyzer 331 may receive vectors from vector database (DB) 332, and the embeddings may be appended to a prompt template 333, for example. Embeddings corresponding to the feature toggle information are returned from vector DB 332 and combined with the prompt 333 as in input to the LLM via LLM access layer 334 and LLM API provider 337. The prompt and embeddings may cause the LLM to output dependencies for the enabled feature toggle along with confidence values, for example. Further details of the operation of FIG. 3C are provided below.

The embeddings API 335 refers to a programming interface that allows developers to access pre-trained word or text embeddings. Embeddings are numerical representations of words, phrases, or sentences that capture their semantic and contextual meaning, which may be used in natural language processing (NLP) tasks such as text classification, information retrieval, and machine translation. The embeddings API 335 may provide a way to retrieve embedding vectors for individual words or entire sentences. For example, feature toggle information is input to the LLM and the embeddings are returned. The embeddings can be stored in the vector DB for retrieval later retrieval based on the feature toggle information from the repository 325. The generated embeddings can be used to identify semantic relationships between the text. As there is a limit on prompt length, embeddings (via the vector DB) are first queried to get the relevant information from within a large dataset and then passed along with prompt as mentioned above.

Accordingly, dependency analyzer 331 uses LLM API 336 along with the information present in the feature toggle information repository 325, converted to embeddings, to find the following: (i) feature toggles in other systems that the local system is dependent upon once a local feature toggle is activated in the local system (e.g., find other feature toggles that the current local toggle is dependent on) and (ii) feature toggles in other systems that might be dependent on the activated local feature toggle within the local system (e.g., find other feature toggles that are dependent on currently activated feature toggle).

Accordingly, FIGS. 3A and 3B provide a smart, intelligent upgrade recommender based on the concept of feature toggles in distributed systems which automatically pick up the correct implementation that needs to install in the hybrid systems to keep the entire system consistent and error free. Further, FIGS. 3A and 3B illustrate feature toggles in a distributed system with generative AI and LLM's to create a feature toggle dependency analyzer to ensure that feature toggles across the disturbed systems are capture correctly and linked based on dependencies to ensure that an interconnected system does not run into inconsistency issues and related error conditions.

Figure 4A:
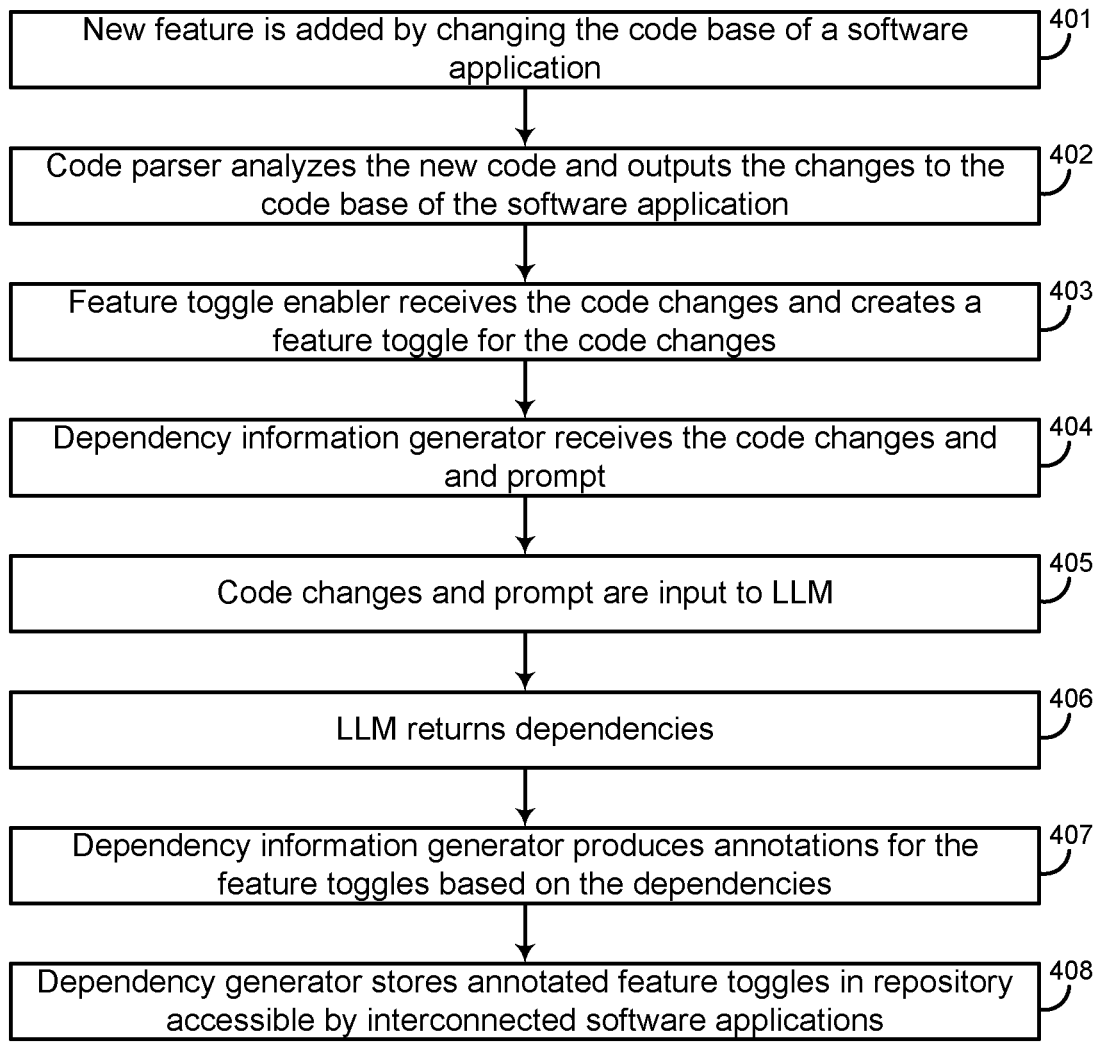
FIG. 4A illustrates an example method of generating dependency information according to an embodiment.

FIG. 4A illustrates an example method of generating dependency information according to an embodiment. The following illustrates a method of generating feature toggles and dependency information for the feature toggles according to an embodiment. The function of feature toggle generator 316 in FIG. 3B is to create feature toggles with dependency information. At 401, a new feature is added to a software application by changing the code base of the software application. The software application may be one application of a plurality of interconnected (interoperating) cloud software applications 314, for example. At 402, the code parser analyzes the new code and outputs the changes in the code base of the software application to feature toggle enabler 317. At 403, the feature toggle enabler receives the code changes and creates a feature toggle for the code changes. For example, if the feature is a new button in the software application, code parser extracts the new code for new button, and the feature toggle enabler adds a feature toggle to the new button so it can be enabled and disabled. Dependency information generator 319 is configured to determine dependencies of the new feature toggle. At 404, the dependency information generator receives the code changes and a prompt. In some embodiments, code may include comments, and the dependency information generator may receive code changes and comments for the code changes, for example. At 405, the code changes and the prompt are input to an LLM. For example, the prompt 316 may be received by dependency information generator 319, where the prompt is text (e.g., "identify dependencies of the appended code for systems X, Y, and Z"). In some embodiments, code is appended in chucks below a token limit for the LLM. Accordingly, the same prompt text may be sent to the LLM multiple times with different code chucks until all the code chunks have been processed. In some embodiments, the LLM may further receive an input confidence level indicating a minimum level of confidence for a dependency to be returned by the system. At 406, the LLM returns dependencies corresponding to the code changes. At 407, the dependency information generator produces annotations for the feature toggles based on the dependencies. At 408, the dependency generator stores the annotated feature toggles in a repository accessible by the interconnected software applications. The dependency generator may store the annotated feature toggles using cockpit 314 to access repository 315. Cockpit 314 may be similar to a database management system, for example, and may be accessible by the plurality of interconnected software systems (e.g., applications) so that any application may access or call the repository directly, for example. In some embodiments, the repository stores a feature toggle associated with annotations describing the dependencies, including system names or IDs, code, a confidence percentage, and APIs for the systems (e.g., feature toggle <associated with>@DependentOn: {Systems1-Code1, System2-Code2, % conf, API name sys1, API name sys2, brief text description of code changes for the feature toggle}).

Figure 4B:
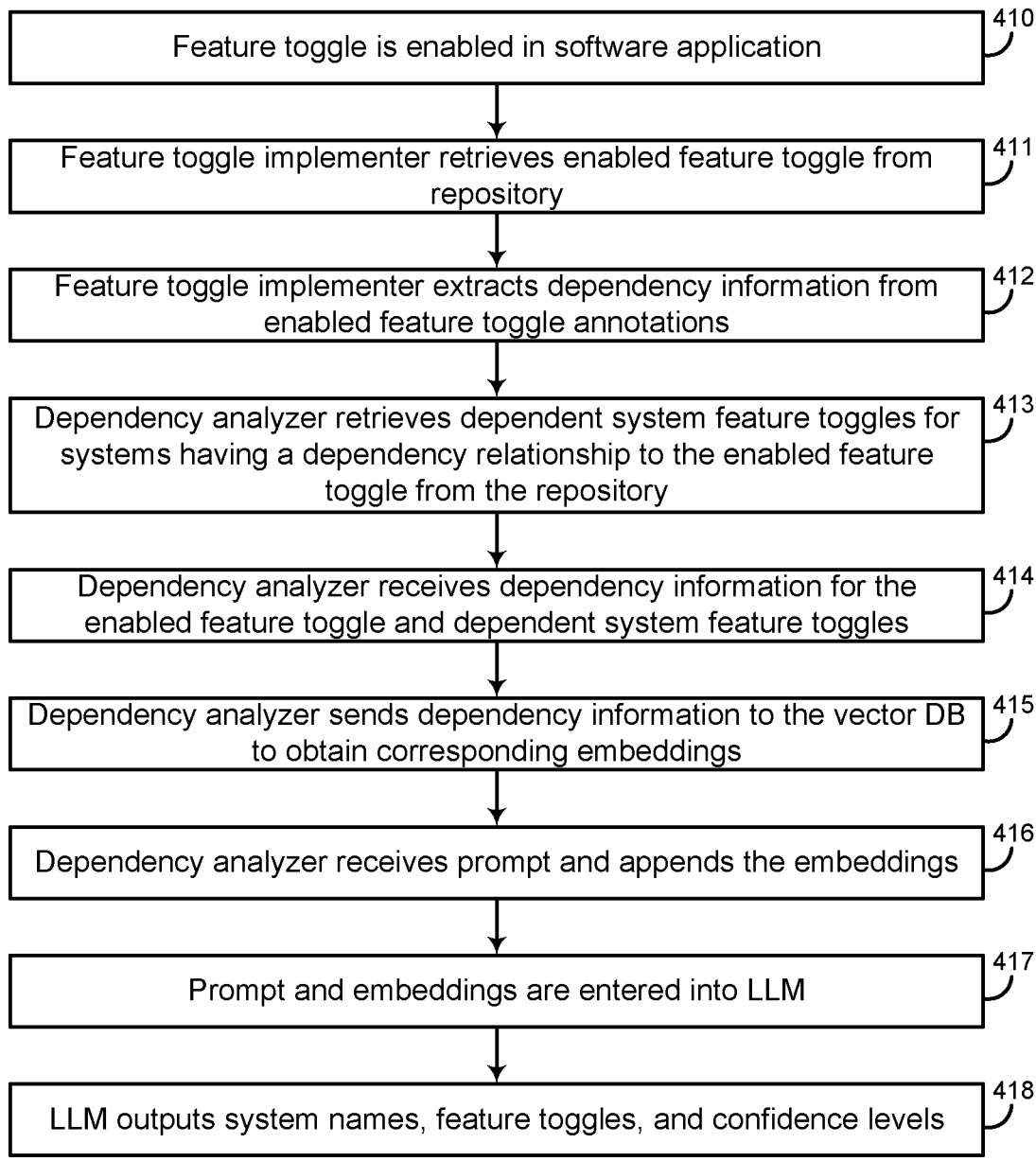
FIG. 4B illustrates an example method of analyzing dependency information according to an embodiment.

FIG. 4B illustrates an example method of analyzing dependency information according to an embodiment. As mentioned above, before dependency analysis occurs, the annotated feature toggle information in repository 315 in FIG. 3C may be converted to embeddings by embedding APIs 323 and 326 and stored in vector DB 320. Dependency analysis may then proceed as follows. At 410, a feature toggle is enabled in a software application. At 411, the feature toggle implementer retrieves the enabled feature toggle and annotations from the repository. At 412, the feature toggle implementer extracts dependency information from the enabled feature toggle annotations. At 413, the dependency analyzer retrieves dependent system feature toggles for systems having a dependency relationship to the enabled feature toggle from the repository. At 414, the dependency analyzer receives dependency information for the enabled feature toggle and annotated feature toggles from systems having a dependency relationship with the enabled feature toggle. At 415, the dependency analyzer sends the dependency information to the vector DB to obtain corresponding embeddings. At 416, the dependency analyzer receives a prompt and appends the embeddings. At 417, the prompt and embeddings are entered into an LLM. At 418, the LLM outputs system names, feature toggles, and confidence levels.

The following is a summary of actions that may be performed by some example embodiments of the present disclosure. A feature toggle may be enabled in the cloud application (e.g., any system can activate any feature toggle in in any system because it is decentralized). A feature toggle implementer retrieves all information for the active feature toggle from a repository to obtain dependency information to determine if other dependent feature toggles are impacted (e.g., dependency info and all feature toggles on all systems with a dependency to the activated feature toggle). The dependency analyzer receives the dependency information regarding the activated feature toggle (e.g., name/unique ID, system it resides in, and the above stored dependency information). The dependency analyzer sends the dependency information to the vector DB and receives an embedding corresponding to the dependency information. The dependency analyzer receives a prompt ("for these feature toggles for these systems, what are the feature toggles that are dependent on the activated feature toggle") and appends the activated feature toggle and the feature toggles retrieved from the other systems. The system enters the prompt and feature toggles into the LLM. The LLM outputs system names and feature toggles that need to be activated in connection with the new enabled feature toggle. The LLM may further output a likelihood/confidence level, for example.

Figure 5:
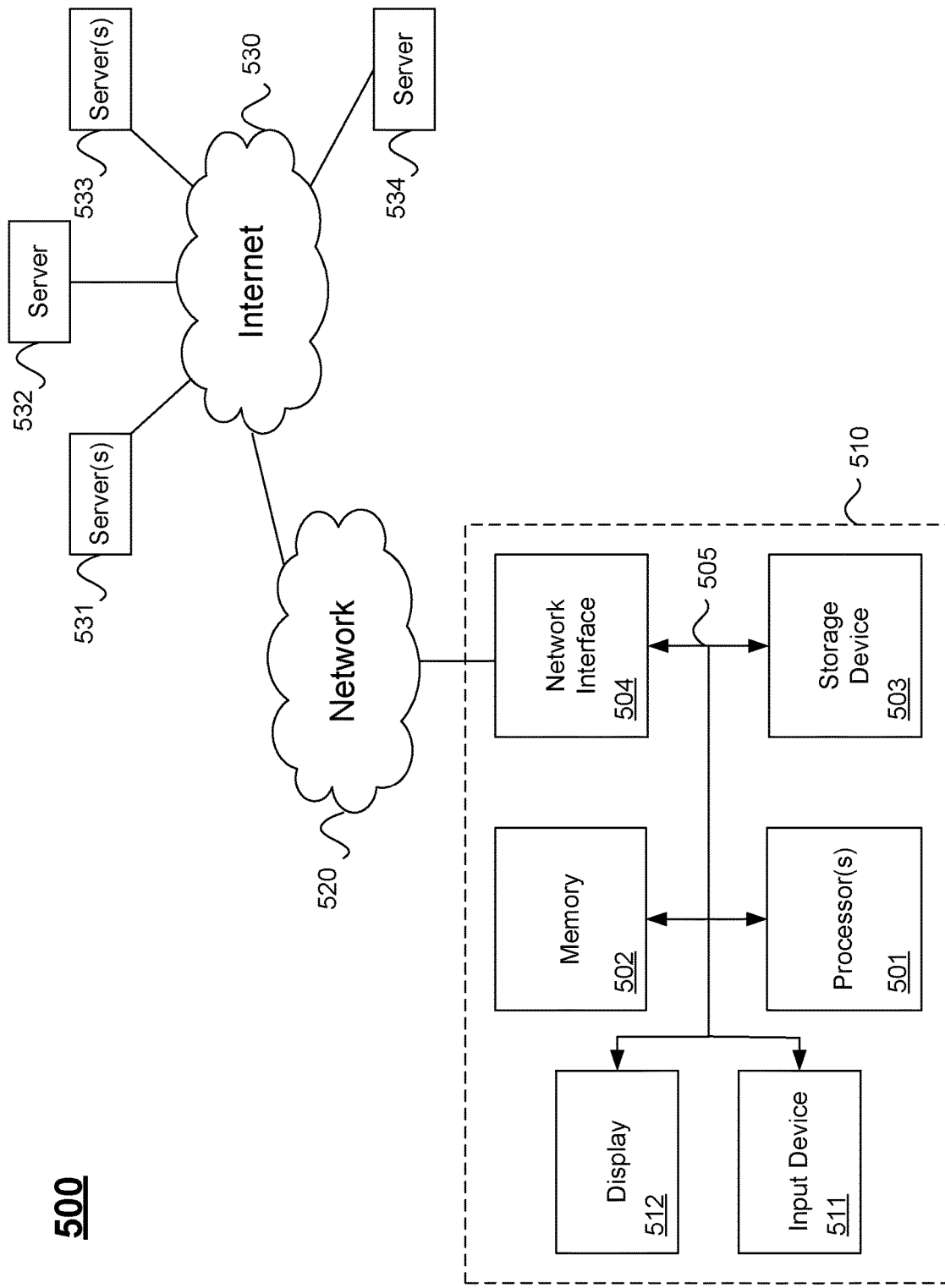
FIG. 5 illustrates hardware of a special purpose computing system configured according to the above disclosure.

FIG. 5 illustrates hardware of a special purpose computing system 500 configured according to the above disclosure. The following hardware description is merely one example. It is to be understood that a variety of computers topologies may be used to implement the above-described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 503 may include source code, binary code, or software files for performing the techniques above, for example. Storage device 503 and memory 502 are both examples of non-transitory computer readable storage mediums (aka, storage media).

In some systems, computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a frontend (e.g., a browser), for example, may access data and features on backend software systems that may reside on multiple different hardware servers on-prem 531 or across the network 530 (e.g., an Extranet or the Internet) on servers 532-534. One or more of servers 532-534 may also reside in a cloud computing environment, for example.

Further Examples

Each of the following non-limiting features in the following examples may stand on its own or may be combined in various permutations or combinations with one or more of the other features in the examples below. In various embodiments, the present disclosure may be implemented as a system, method, or computer readable medium.

Embodiments of the present disclosure may include systems, methods, or computer readable media. In one embodiment, the present disclosure includes computer system comprising: at least one processor and at least one non-transitory computer readable medium (e.g., memory) storing computer executable instructions that, when executed by the at least one processor, cause the computer system to perform a method as described herein and in the following examples. In another embodiment, the present disclosure includes a non-transitory computer-readable medium storing computer-executable instructions that, when executed by at least one processor, perform a method as described herein and in the following examples.

In some embodiments, the present disclosure includes a decentralized feature toggle method comprising: generating a plurality of feature toggles for a plurality of interconnected software systems, the feature toggles enabling and disabling particular features of the plurality of interconnected software systems, wherein the plurality of feature toggles comprise annotations, and wherein, for each feature toggle, the annotations specify program code changes in a local software system where a particular feature toggle is located resulting from said enabling and disabling of the particular feature toggle and program code in the plurality of interconnected software systems that is dependent on the specified program code; gathering, from the plurality of interconnected software systems, the plurality of feature toggles and storing the plurality of feature toggles in a repository; enabling a first feature toggle corresponding to a particular feature on a first software system of the plurality of interconnected software systems; receiving a plurality of second feature toggles corresponding to the particular feature; and determining whether or not an upgrade is required to implement the particular feature on the plurality of interconnected software systems.

In some embodiments, the method further comprising processing, by a large language model, the first feature toggle and a plurality of third feature toggles from software systems having a dependency relationship with the first feature toggle to produce the plurality of second feature toggles.

In some embodiments, the method further comprising analyzing, by a large language model, program code in one or more annotations to identify dependencies of the one or more annotations on other software systems of the plurality of software systems.

In some embodiments, the identified dependencies are stored as tuples comprising linking particular code in a particular system with other particular code in another particular system.

In some embodiments, the method further comprising generating a risk score based on dependencies between the first feature toggle and the plurality of second feature toggles, the risk score indicating a likelihood of an error resulting in the plurality of interconnected software systems from activating the first feature toggle.

In some embodiments, the method further comprising converting the annotations in the plurality of feature toggle into embeddings.

In some embodiments, the method further comprising appending one or more embeddings to a prompt and entering the prompt into a large language model to determine feature toggles in the plurality of software systems other than the first software system that the first feature toggle is dependent on.

In some embodiments, the method further comprising appending one or more embeddings to a prompt and entering the prompt into a large language model to determine feature toggles in the plurality of software systems other than the first software system that are dependent on the first feature toggle.

In some embodiments, the plurality of interconnected software systems is deployed across a hybrid computer system comprising a cloud computer system and an on-premise computer system.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A decentralized feature toggle method comprising:
   generating a plurality of feature toggles for a plurality of interconnected software systems, the feature toggles enabling and disabling particular features of the plurality of interconnected software systems, wherein the plurality of feature toggles comprise annotations, and wherein, for each feature toggle, the annotations specify program code changes in a local software system where a particular feature toggle is located resulting from said enabling and disabling of the particular feature toggle and program code in the plurality of interconnected software systems that is dependent on the specified program code;
   gathering, from the plurality of interconnected software systems, the plurality of feature toggles and storing the plurality of feature toggles in a repository;
   enabling a first feature toggle corresponding to a particular feature on a first software system of the plurality of interconnected software systems;
   receiving a plurality of second feature toggles corresponding to the particular feature; and
   determining whether or not an upgrade is required to implement the particular feature on the plurality of interconnected software systems.

2. The method of claim 1, further comprising processing, by a large language model, the first feature toggle and a plurality of third feature toggles from software systems having a dependency relationship with the first feature toggle to produce the plurality of second feature toggles.

3. The method of claim 1, further comprising analyzing, by a large language model, program code in one or more annotations to identify dependencies of the one or more annotations on other software systems of the plurality of software systems.

4. The method of claim 3, wherein the identified dependencies are stored as tuples comprising linking particular code in a particular system with other particular code in another particular system.

5. The method of claim 1, further comprising generating a risk score based on dependencies between the first feature toggle and the plurality of second feature toggles, the risk score indicating a likelihood of an error resulting in the plurality of interconnected software systems from activating the first feature toggle.

6. The method of claim 1, further comprising converting the annotations in the plurality of feature toggle into embeddings.

7. The method of claim 6, further comprising appending one or more embeddings to a prompt and entering the prompt into a large language model to determine feature toggles in the plurality of software systems other than the first software system that the first feature toggle is dependent on.

8. The method of claim 6, further comprising appending one or more embeddings to a prompt and entering the prompt into a large language model to determine feature toggles in the plurality of software systems other than the first software system that are dependent on the first feature toggle.

9. The method of claim 1, wherein the plurality of interconnected software systems is deployed across a hybrid computer system comprising a cloud computer system and an on-premise computer system.

10. A computer system comprising:
at least one processor;
at least one non-transitory computer readable medium storing computer executable instructions that, when executed by the at least one processor, cause the computer system to perform a method comprising:
generating a plurality of feature toggles for a plurality of interconnected software systems, the feature toggles enabling and disabling particular features of the plurality of interconnected software systems, wherein the plurality of feature toggles comprise annotations, and wherein, for each feature toggle, the annotations specify program code changes in a local software system where a particular feature toggle is located resulting from said enabling and disabling of the particular feature toggle and program code in the plurality of interconnected software systems that is dependent on the specified program code;
gathering, from the plurality of interconnected software systems, the plurality of feature toggles and storing the plurality of feature toggles in a repository;
enabling a first feature toggle corresponding to a particular feature on a first software system of the plurality of interconnected software systems;
receiving a plurality of second feature toggles corresponding to the particular feature; and
determining whether or not an upgrade is required to implement the particular feature on the plurality of interconnected software systems.

11. The computer system of claim 10, further comprising processing, by a large language model, the first feature toggle and a plurality of third feature toggles from software systems having a dependency relationship with the first feature toggle to produce the plurality of second feature toggles.

12. The computer system of claim 10, further comprising analyzing, by a large language model, program code in one or more annotations to identify dependencies of the one or more annotations on other software systems of the plurality of software systems.

13. The computer system of claim 12, wherein the identified dependencies are stored as tuples comprising linking particular code in a particular system with other particular code in another particular system.

14. The computer system of claim 10, further comprising generating a risk score based on dependencies between the first feature toggle and the plurality of second feature toggles, the risk score indicating a likelihood of an error resulting in the plurality of interconnected software systems from activating the first feature toggle.

15. The computer system of claim 10, further comprising converting the annotations in the plurality of feature toggle into embeddings.

16. The computer system of claim 15, further comprising appending one or more embeddings to a prompt and entering the prompt into a large language model to determine feature toggles in the plurality of software systems other than the first software system that the first feature toggle is dependent on.

17. The computer system of claim 15, further comprising appending one or more embeddings to a prompt and entering the prompt into a large language model to determine feature toggles in the plurality of software systems other than the first software system that are dependent on the first feature toggle.

18. A non-transitory computer-readable medium storing computer-executable instructions that, when executed by at least one processor, perform a method, the method comprising:
generating a plurality of feature toggles for a plurality of interconnected software systems, the feature toggles enabling and disabling particular features of the plurality of interconnected software systems, wherein the plurality of feature toggles comprise annotations, and wherein, for each feature toggle, the annotations specify program code changes in a local software system where a particular feature toggle is located resulting from said enabling and disabling of the particular feature toggle and program code in the plurality of interconnected software systems that is dependent on the specified program code;
gathering, from the plurality of interconnected software systems, the plurality of feature toggles and storing the plurality of feature toggles in a repository;
enabling a first feature toggle corresponding to a particular feature on a first software system of the plurality of interconnected software systems;
receiving a plurality of second feature toggles corresponding to the particular feature; and
determining whether or not an upgrade is required to implement the particular feature on the plurality of interconnected software systems.

19. The non-transitory computer-readable medium of claim 18, further comprising processing, by a large language model, the first feature toggle and a plurality of third feature toggles from software systems having a dependency relationship with the first feature toggle to produce the plurality of second feature toggles.

20. The non-transitory computer-readable medium of claim 18, further comprising analyzing, by a large language model, program code in one or more annotations to identify dependencies of the one or more annotations on other software systems of the plurality of software systems.

* * * * *